United States Patent [19]

Woolley, Jr.

[11] 4,359,832

[45] Nov. 23, 1982

[54] LIGHT POLARIZING LAMINATION AND SYSTEM EMPLOYING SAME

[76] Inventor: Francis L. Woolley, Jr., 1513 Durwood Ct., Reading, Pa. 19609

[21] Appl. No.: 185,723

[22] Filed: Sep. 11, 1980

[51] Int. Cl.³ .............................................. G09F 13/00
[52] U.S. Cl. .......................................................... 40/434
[58] Field of Search .................. 40/434, 615; 350/396; 428/195, 211, 913; 358/4

[56] References Cited

U.S. PATENT DOCUMENTS

| | | | |
|---|---|---|---|
| 2,173,304 | 9/1939 | Land et al. | 350/396 X |
| 2,334,446 | 11/1943 | Serrell | 350/396 |
| 2,440,105 | 4/1948 | Land | 350/396 |
| 2,441,019 | 5/1948 | Georgian et al. | 350/396 X |
| 2,487,063 | 11/1949 | Marks | 350/396 X |
| 2,846,799 | 8/1958 | Viszlo | 40/434 |
| 2,882,631 | 4/1959 | Boone | 40/615 |
| 3,054,204 | 9/1962 | Yates | 40/431 X |
| 3,055,131 | 9/1962 | Novak | 40/471 |
| 3,437,401 | 4/1949 | Siksai | 40/431 X |
| 4,025,688 | 5/1977 | Nagy et al. | 40/431 |

*Primary Examiner*—Paul J. Hirsch
*Assistant Examiner*—Wenceslao J. Contreras
*Attorney, Agent, or Firm*—Synnestvedt & Lechner

[57] ABSTRACT

Undesirable visual effects, such as blinking, observed when an animated image produced by means of polarized light is viewed by means of a color television camera or a similar device which is sensitive to the angle of polarization of light which it views, are avoided by use of animating lamination which includes, between the layer of polarmotion material and the artwork transparency, an intermediate depolarizing layer of vellum-parchment drawing paper.

15 Claims, 6 Drawing Figures

LIGHT POLARIZING LAMINATION AND SYSTEM EMPLOYING SAME

FIELD OF THE INVENTION

This invention relates to apparatus and systems for producing animated images by means of polarized light, and particularly to certain improvements therein by virtue of which undesired visual effects, arising when the image is viewed through the agency of a color television camera or other viewing device sensitive to the angle of polarization of light incident thereon, are obviated.

BACKGROUND OF THE INVENTION

Systems are known in the prior art by virtue of which at least a part of a fixed artwork transparency is caused to give the appearance of motion in the image. This is typically accomplished by generating a broad beam of polarized light, the direction of polarization of which is systematically rotated, and passing this beam of light first through a polarizing layer transparent, or at least strongly translucent, polarizing elements which polarize light passing therethrough in respectively different transverse directions (hereinafter referred to as the polarmotion material, element or layer), and then through an artwork transparency; preferably, a light-diffusing layer is also provided between the polarmotion material and the artwork transparency. As is well known, these polarmotion elements transmit polarized light applied thereto to different degrees, depending upon whether the polarization axis of the material of a given element is parallel to that of the incident polarized light, in which case light transmission is a maximum, or is at right angles to the direction of polarization of the incident light, in which case the transmitted light is a minimum, or is at some intermediate angle in which case the transmitted light is at a corresponding intermediate level. Because of this arrangement, a beam of incident light having a rotating direction of polarization causes different ones of the polarmotion elements to become highly transmissive, i.e. brighter, at different times while others of the elements become successively less transmissive and in effect darker, to a degree depending upon the instantaneous angle of orientation of the incident polarized light. This changing of the brightness of different elements of the polarmotion material is typically used to produce progressive changes in the brightness of adjacent elements in the art transparency and a corresponding appearance of motion in the viewed image. In many cases, only portions of the artwork transparency are to give the appearance of motion, in which case only those portions are backed with polarmotion material.

The typical nature and theory of operation of such devices need not be set forth or explained herein in detail, since they are well known and are, for example, set forth in U.S. Pat. No. 3,054,204 of Donald N. Yates, filed Dec. 9, 1959 and issued Sept. 18, 1962.

While such apparatus has been successful for many purposes, it has been found that when the animated polarized light image is to be viewed not directly by the naked eye, but by means of optical systems which are sensitive to changes in the direction of polarization of light incident thereon, then undesired visual effects arise in the ultimately-formed image which is viewed by the eye directly.

A common situation in which these undesired effects occur, and with reference to which the invention will be specifically described hereinafter, is that in which an animated polarized light display is viewed by a color television camera of the usual type. A color television camera of the type employed in the U.S. system of color television typically includes beam splitters and/or dichroic mirrors or other optical devices which are sensitive to changes in the polarization angle of light incident thereon. Such a device will ordinarily reflect or transmit light with much greater intensity when the incident light is polarized along a specific direction than when it is polarized at right angles thereto, and with an intermediate strength for intermediate angles of incidence. Color motion picture cameras also typically employ similar optical elements having a similar sensitivity to direction of polarization of incident light.

More particularly, in such an arrangement the light reaching the camera or other optical device from any portions of the artwork transparency not backed by polarmotion material is polarized and has a rotating direction of polarization, the intensity of such rotating polarized light being however uniform as a function of time. Light reaching the camera or other optical device from the portions of the artwork transparency backed by polarmotion material is also polarized, but the light from any such image portion varies in time according to the instantaneous angle of orientation of the polarized light with which it is illuminated, and the light from different sets of similar polarmotion elements have respectively different directions of polarization.

When light from such a transparency reaches a dichroic mirror or other polarization-angle sensitive device in a viewing camera, such device acts similarly to a polarization analyzer in that it transmits or reflects an intensity of light which depends not only upon the intensity of the light incident thereon, but generally also upon the direction of polarization thereof, and also generally upon the angle at which the light reaches the dichroic mirror or similar device from the polarmotion transparency. Because of this, when viewed through the agency of a color television camera, portions of the viewed transparency which are not backed by polarmotion material will appear to "blink", changing from a very high intensity to a very low intensity twice for each rotation of the polarizing spinner.

As to those portions of the transparency backed by polarmotion material, although the light from each such portion remains at the same polarization angle, the intensity of light which it produces at any given time is distorted by the analyzing effect of the viewing camera. That is, if the polarization angle for which the camera is most sensitive is aligned with certain sets of elements in the polarmotion material, it will pass on such light without substantial diminution. However, light from those elements of the polarmotion material having polarization angles at 90° to the effective polarization-analyzer angle of the camera will be passed on by the camera optics only to a very slight extent or substantially not at all. Light from the polarmotion material which is at intermediate polarization angles will be passed on by the camera optics to an intermediate degree. Furthermore, the angle at which the light reaches the camera optics, and hence the angular orientation of the camera with respect to the animated display, will also affect the extent to which the camera optics pass on the light incident thereon from the animated image. The result is that the carefully constructed animated polarized light image is greatly and unpredictably distorted by the camera optics, typically so that a smooth-flowing motion carefully built into the animated polarized light image by the fabricator becomes irregular, jumpy, and often loses all semblance of appearance of smooth flow under these conditions of viewing by typical camera optics which are sensitive to the angle of polarization of light incident thereon.

A specific and important aspect of the invention for commercial purposes lies in its use to produce video tapes of images at least part of which appear to possess motion. In the case of advertising materials, such as television station advertising of sponsor product or of its own services, programs or call letters, it is relatively cheap and convenient to make up a display of the desired type utilizing polarmotion elements and then to view it with a color television camera, the output of which is recorded on video tape. Such tape may then be utilized whenever desired during television broadcasting, in the usual way. Another important aspect lies in the production of video tapes for educational purposes, for example in explaining functions occurring in living things, or in explaining operations of machines or scientific devices. By creating such images first as images animated by polarized light and then converting them, by appropriate color television camera means, into color video tapes, a very simple and inexpensive method is provided for making such motion-containing materials available to the public.

Another aspect of the invention deals with the problems of image intensity and image definition. Color television cameras operate most successfully from very bright images and, as will become more apparent hereinafter, arrangements according to the present invention provide extremely bright images, such as cannot readily be obtained with projected or reflected images. Further, particularly in relation to educational displays, it is often desirable to enable the camera to concentrate upon and enlarge a relatively small section of the display to show it clearly in more detail, and unless the image presented to it is of relatively high definition, such detail will not appear as desired. The present invention also makes available such high difinition, as will also become more apparent from the discussion set forth hereinafter.

Accordingly, it is an object of the invention to provide new and improved apparatus for producing animated images by means of polarized light.

It is also an object to provide a new and improved lamination for producing animated images by means of polarized light (hereinafter referred to as the animating lamination).

Another object is to provide a new and improved system for obtaining color television images of animated displays produced by polarized light.

A further object is to provide the latter type of system with improved intensity and definition in the resultant color television image.

It is also an object to provide color television images from an animated display produced by polarized light, which images reproduce faithfully the original animated image without appreciable distortion from the appearance which the animated image would have when viewed directly by the human eye.

It is also an object of the invention to provide a new and improved system for producing color video tape of images at least parts of which have the appearance of motion.

SUMMARY OF THE INVENTION

In accordance with the invention, there is provided a new lamination for producing animated images by means of polarized light in which a layer of depolarizing material, preferably in the form of a sheet of vellum-parchment drawing paper, is interposed between the polarmotion material and the artwork transparency delineating the image. The layer of depolarizing material serves to randomize the orientations of the directions of the electric and magnetic vectors of the light incident thereon from the polarmotion material, so that the light emanating from the depolarizing material and reaching the artwork transparency is no longer polarized in the usual sense of the word. As a result, when the resultant animated polarized light image is viewed by apparatus including polarization-angle sensitive components, such apparatus accurately and faithfully reproduces the animated polarized light image which it views, without the blinking and distorting effects described hereinabove.

The layer of depolarizing material preferably also provides a light diffusing function similar to that provided by the diffusing layer in previously-known laminations used to produce polarized light animated images, in which case the lamination of the present invention can readily be provided merely by substituting the layer of depolarization material for the diffusing layer previously used in such laminations. Vellum-parchment drawing paper has been found to have both the depolarizing and diffusing properties desired, and hence is especially well-suited for the present purposes.

The lamination of the invention is preferably used in a system in which a viewing device, such as a color television camera, looks directly at the front of the art transparency with the light source behind it. Since the light source may be made very bright, especially during the time intervals when the color television camera is turned on, extremely bright images are thereby presented to the color television camera as is desired for best results. Furthermore, since the depolarizing layer located as described above does nothing to reduce the image definition present in the artwork transparency at the front of the assembled lamination, there is no degradation in definition at all by the use of the depolarizer layer, and close-ups of small portions of the animated polarized light display can be taken by the color television camera so as to present fine detail of the display when so desired. The resultant electronic form of the image created by the color television camera is then of excellent quality of making high quality color video tapes, suitable for the purposes outlined hereinabove. All this is accomplished with no appreciable increase in cost, the only difference in cost being the difference between the cost of a single sheet of vellum-parchment drawing paper and that of an ordinary sheet of diffusing material, which difference is trivial.

BRIEF DESCRIPTION OF FIGURES

These and other objects and features of the invention will be more readily understood from a consideration of the following detailed description, taken in conjunction with the accompanying drawings, in which.

DESCRIPTION OF SPECIFIC EMBODIMENTS

Figure 1:
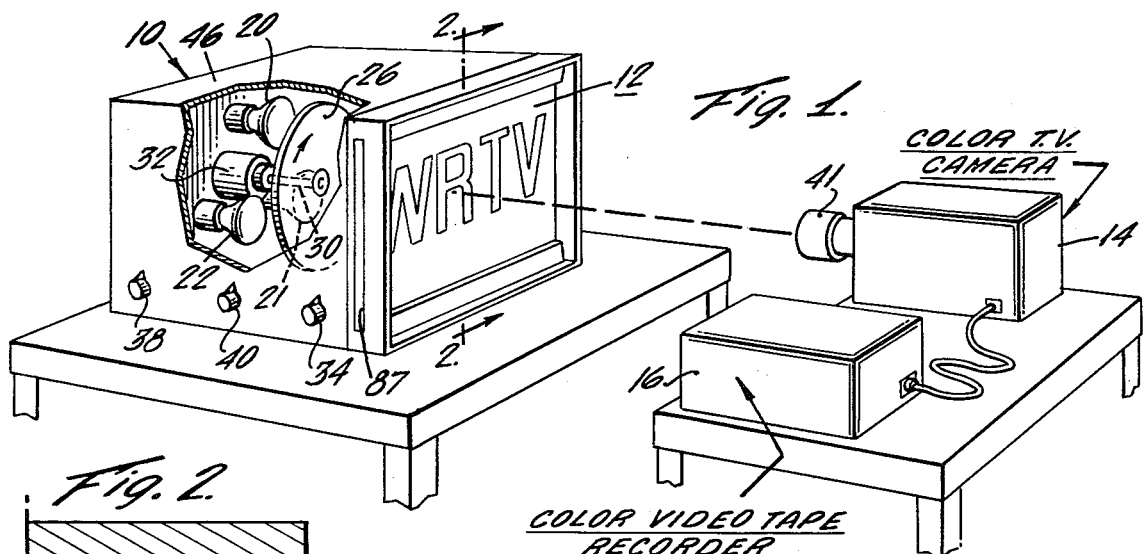
FIG. 1 is a perspective view illustrating one preferred form of a system embodying the invention.

Turning now to the preferred embodiment of the invention shown by way of example only in the drawings, in FIG. 1 there is shown a complete system for generating color video tapes of polarmotion displays. The system comprises, generally, polarized light animated image-generating apparatus 10 which produces an animated image on the front face of the lamination 12; the latter image is viewed by a color television camera 14 of conventional type, the electrical output of which is used to operate a color video tape recorder 16, thereby to produce video tapes of the image on the lamination 12.

The image-generating apparatus 10 comprises means for applying polarized light to the rear or interior surface of the animating lamination 12, the direction of polarization of which light is rotatable. In the present embodiment, this means comprises a source of light in the form of three electric lamps 20, 21 and 22 positioned to direct light forwardly toward the interior or rear side of lamination 12, and a rotatable polarizing disc 26 positioned between the source of light and the rear of the lamination. Polarizing disc 26 is mounted on a rotatable shaft 30, which in turn is rotatable by means of an electric motor 32 controlled from switch 34. Lamps 20, 21 and 22 may be turned on and off by means of an electrical light switch 38, and when turned on may be switched between a full intensity condition and a lower-level dim condition by means of another electrical control switch 40, in known manner.

In the general operation of the portion of the apparatus described above, the lamps 20, 21 and 22 are turned on by operation of switch 38 with dim switch 40 in its dim position, and spinner switch 34 is turned to its on position to cause polarizing disc 26 to rotate about the axis of shaft 30, usually at a relatively low rate such as one or two revolutions per second. In FIG. 1, the entire polarizing disc 26 is polarized in the same transverse direction, which direction is of course fixed with respect to the disc and therefore rotates with rotation of the disc. The polarized light with rotating direction of polarization from disc 26 falls upon the rear of lamination 12 and passes through its transparent, or highly translucent, elements to the light-receiving end 41 of the optical system of color television camera 14. It will be understood that the color television camera contains the usual optical system which is sensitive to the direction of polarization of light incident thereon. The polarized light animated image formed on the front surface of the lamination 12 may have any of a large variety of forms well known in the art, sometimes consisting of images which contain motion throughout, and in other instances consisting of images only parts of which give the appearance of motion, depending upon the interests of the user. For purposes of simplicity in the present example, a very simple image consisting of the letters WRTV, corresponding to the call letters of a fictional television station, on a plain bright field is shown as comprising the image in this case, and it is assumed that the letters are to contain an apparent downward flow of light patterns due to the polarized light effect while the remainder of the image is to remain at a fixed brightness.

When the image-generating apparatus 10 has been set up as desired, and the color television camera and its associated equipment are ready, the dimmer switch 40 is switched to its high intensity position so as to provide very strong illumination of the polarmotion lamination 12, and the color television camera is rendered operative to televise the animated image and, in this example, to form a color video tape recording thereof by means of recorder 16. When the tape is completed, the dimmer switch 40 is returned to its low intensity position, so as to avoid unnecessary strong heating of the lamination by the high intensity light from sources 20, 21 and 22.

It will be understood that the image generating apparatus 10 thus far described is, in this example, housed in a light impervious box 46, which serves to mount the elements described and to shield the rear surface of the polarmotion lamination 12 from ambient illumination. Preferably the disc 26 is large enough compared to the arrangement of lamps 20, 21 and 22 that light from the latter lamps cannot reach the animating lamination 12 directly except by way of the rotatable polarizing disc 26.

Figure 2:
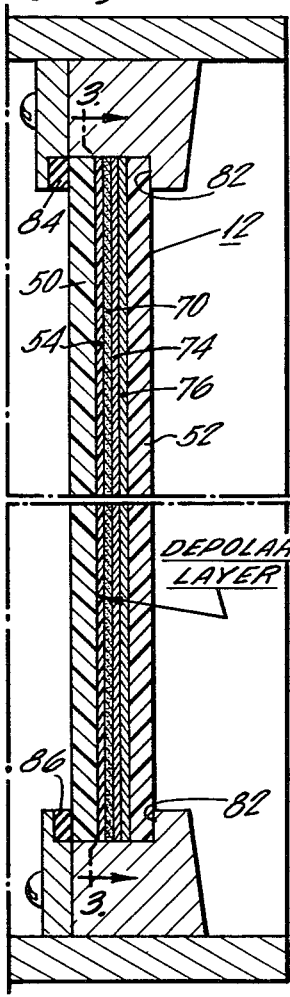
FIG. 2 is an enlarged fragmentary elevational sectional view of the inventive lamination utilized in the embodiment of FIG. 1, taken along lines 2—2.

FIG. 2 shows the animating lamination 12 in more detail. In this example it comprises a multi-layer sandwich of six contiguous layers each extending entirely across the lamination in transverse directions. The rearmost layer facing the polarizing disc 26 is a transparent supporting plate 50, which may be of glass, and a similar supporting plate 52 is positioned on the opposite front face of the lamination. Progessing from the rear support plate 50 in the direction travelled by the polarized light, the next layer is the layer or sheet 54 of polarmotion material. This layer or sheet may be of well-known construction, consisting of transparent, or at least highly translucent, material which, in those regions corresponding to the portions of the image in which motion is not to be produced, consists of non-polarizing material, while within the regions corresponding to those in which motion is to be produced it consists of elements which are light polarizing and which are polarized in different angular directions in the plane transverse to the direction of travel of the incident light.

Figure 3:
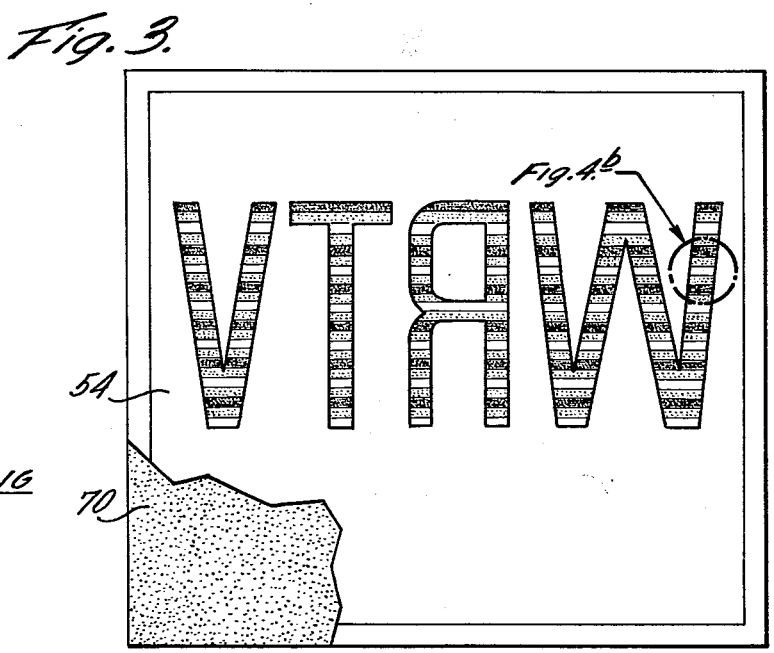
FIG. 3 is a rear view of the lamination of FIG. 2, viewed along the direction 3—3 in FIG. 2.

By way of example only, FIG. 3 shows a rear view of such a polarmotion layer or sheet 54 in a very simple form for purpose of illustration only, as it may be constituted to produce an apparent flow of light downward and within the letters WRTV as the polarizing disc 26 rotates. Thus, each of the letters WRTV is divided into similar groups of vertical elements such as 56, 58, 60 and 62, which groups repeat in the same order through the rest of the letters. The directions of polarization within each of these elements is represented by the directions of the lines which are drawn within each vertical element in FIG. 4b, and it will be seen that these directions, in this example, shift angularly by 45° progressively from element to element. Accordingly, as the polarizing disc 26 rotates, first one and then the next element will pass light of greatest intensity, with those elements polarized at right angles to the direction of polarization of the polarizing disc becoming successively darker. It will be understood that the sizes of the polarmotion elements have been exaggerated in the drawings for clarity, and many more smaller elements will usually be used in practice.

The next layer in the animating lamination 12 is the depolarizer layer 70 provided in accordance with the present invention. It is at this point in the assembly that animating laminations of the prior art employ a simple diffusing layer or sheet, without polarizing properties, merely to remove the visibility of the discrete line or element structure imposed on the light by the polarmotion sheet of layer. In the present example, however, the depolarizing layer or sheet not only diffuses the light but also randomizes the directions of polarization of the light emanating from the polarmotion layer, so that such light is similar to ordinary light in this respect.

The preferred material for the depolarizing sheet or layer is a sheet of vellum-parchment drawing paper of the type often used by draftsmen as tracing paper, such as Type 51 H parchment tracing paper manufactured by Borden & Riley Paper Co., Long Island City, N.Y., typically about 0.005 inch in thickness, and available from drafting supply stores. In addition to providing the essential depolarizing function, such paper also provides the desired diffusing action, so that no additional diffusing sheet is required.

As is particularly clear in FIG. 3, in this example the layer of sheet of polarmation material 54 is assumed to be of a known conventional type having a pressure-adherent surface such that it may be assembled to the depolarizing sheet 70 merely by appropriately locating it and pressing it tightly against the rear of sheet 70, whereby sheets 54 and 70 then comprise a single bonded unit.

Next in the animating lamination is a color artwork layer or sheet 74 followed by a black-and-white artwork layer 76, which together may be considered to comprise a composite artwork transparency layer. Thus, in this example the black-and-white artwork layer 76 may comprise a transparent sheet having therein black lines outlining the letters WRTV, while the color artwork layer 74 may comprise an otherwise colorless transparent sheet containing transparent regions which are appropriately colored, in the sense that they will transmit light of selected coloration. For example, the color artwork may comprise a neutral transparency having red portions aligned with the letters WRTV throughout their thicknesses, so that when the animating lamination is viewed from the front the letters WRTV appear red when the light sources 20, 21 and 22 are turned on. The artwork transparency, in this case comprising two layers 74 and 76, may in some cases comprise a single layer; for example, it may consist only of the black and white artwork layer, or only of the color artwork layer, or of a single composite layer in which the artwork is outlined in black and the interior between the black lines is of the desired color. Again, these considerations being well known in the prior art, it is unnecessary to describe them in detail.

As mentioned previously, forward of the artwork transparency is another transparent supporting layer 52 typically of glass, and the various layers or sheets of the animating lamination may be held closely against each other by means of upper and lower channels 82, provided with suitable resilient strips such as 84 and 86 for holding the layers of the lamination tightly together when the lamination is slid into the channels slot 87 in box 46 (FIG. 1), although any convenient arrangement may be used for this purpose.

As set forth previously, the color television camera 14 views the front face of the animating lamination, and contains in its optical path elements which are sensitive to changes in polarization angle of light which it views, and in many cases also sensitive to the angle at which such light reaches them. Typical of such elements are dichroic mirrors, birefringent beam splitting elements, and certain types of reflecting surfaces which reflect substantially only light of a given polarization angle. As an example only, FIG. 4c indicates at 90 a reflecting element in the optical system of the color television camera, the heavy arrow 92 indicating a light ray from the polarmotion display incident at an angle other than normal on the point 94 of optical element 90, while heavy arrow 96 indicates a ray reflected from element 90 in response to incident ray 92. The small transverse arrows in FIG. 4c indicate the direction of the component of polarized light incident thereon which element 90 reflects efficiently, light components of other polarizations being substantially absorbed or transmitted by element 90 rather than reflected.

Figure 4A:
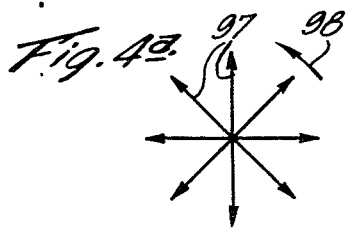
FIGS. 4a, 4b and 4c are diagrams illustrating certain polarization conditions, to which reference will be made in explaining the problem which the present invention overcomes.
Figure 4B:
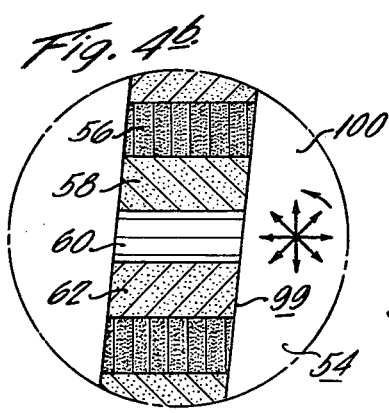

Referring now to FIG. 4a, the several angularly-displaced straight arrows such as 97 therein, together with curved arrow 98, are intended to represent successive polarization directions of light which has passed through the polarizing disc 26 in FIG. 1, as it would appear looking at the rear of polarmotion lamination 12, which direction rotates along with the rotation of polarizing disc 26. FIG. 4b represents a small section of the polarmotion layer 54 containing at 99 a portion of one of the letters WRTV and containing at 100 a portion of transparent material without polarizing characteristics outside of the letters WRTV. The arrows within the region 99 indicate the assumed directions of polarization of the polarmotion material layer in four adjacent elements thereof, which are also the directions of polarization of light which these elements transmit substantially exclusively. The set of angularly displaced arrows shown in region 100 represents the fact that such regions transmit light of various different angles of polarization as the polarizing disc 26 rotates.

Figure 4C:
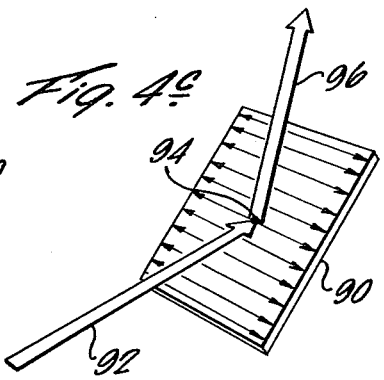

Comparing first the light passing through portion 100 with the reflecting characteristics of element 90 in FIG. 4c, it will be seen that element 90 reflects substantially only that component of light passing through the non-polarizing portion of the polarmotion layer outside of the letters WRTV which is polarized along the horizontal direction, and since, in the absence of the depolarization layer of the invention, such light assumes the horizontal direction only twice per cycle of revolution of polarizing disc 26, the light reflected by element 90 in such case will be very intense twice per revolution and much dimmer or completely dark at intervening positions of the polarizing disc. This results in a very strong undesired blinking effect from such regions of the animating lamination if the depolarizer layer employed in accordance with the present invention is not present. The depolarizing layer, however, randomizes the polarization angle of light incident thereon so that the light emerging from it consists of a mixture of light of all polarization angles, and hence at any time there is a substantial component of light the polarization angle of which is parallel to the transverse arrows in FIG. 4c, and the intensity of these components remains constant with time, so that the above-described blinking effect no longer occurs.

As to the portions of light passing through the elements at 99 in FIG. 4b, it will be seen that only those at 60 are parallel to the direction of polarization which is reflected efficiently by optical element 90 in FIG. 4c, and hence light from such elements will be strongly reflected by element 90 and passed on to other elements in the optical system of the color television camera.

Light having a polarization angle like that at 56 in FIG. 4b will be reflected substantially not at all by element 90, while light having the 45° polarization orientations illustrated at 58 and 62 will be reflected by element 90 but only to an intermediate degree. The result is that when, due to rotation of polarizing disc 26, the vertically polarizing element 56 of FIG. 4b is intended to produce a bright-appearing element, in the absence of the present invention it will instead produce substantially no light from the optics in the camera, and light passing through the elements 58 and 62, polarized at 45°, will only produce a part of its intended full intensity when the polarizing disc has rotated to be aligned with it. The result is a complete distortion of the intended appearance of a progressive movement of the bright portion of the display sucessively along 99, and an undesired jumpy appearance of the animated polarized light display. This very undesirable effect is overcome by the depolarizing layer 70 utilized in accordance with the invention, which assures that the light reaching element 90 in the optics of the color television camera will be depolarized, as is normal light, and hence the reproduction of the animated polarized light image produced by the camera will be in conformance with that appearance which it presents to the naked eye directly viewing the front of the animated display, as desired.

As pointed out previously, the improvement due to the invention can be provided merely by replacing the usual diffusing layer in the animated lamination with a depolarizer sheet or layer, preferably ordinary vellum-parchment drawing paper, which preferably also serves a diffusing function. Accordingly, the blinking effects of the portions of the display not intended to give the appearance of motion are obviated, as are the distortions of the desired appearance of motion in the polar-motion portions of the display, in a manner which is extremely simple, effective and inexpensive.

It will be understood that while the depolarizing sheet of layer may be provided on the front face of the artwork transparency, rather than between the artwork transparency and the polarmotion layer, such an arrangement tends to degrade the definition obtainable in the image due to the diffusing characteristics of the depolarizer sheet, and the highest degree of definition of the image is therefore obtained by locating the depolarizer in the position shown, i.e. between the polarmotion layer and the artwork transparency. Also, although the above-described vellum-parchment paper has been found excellent and is preferred for use as the depolarizing layer, advantages of the invention may be obtained using other materials such as certain known sheet plastic materials having depolarizing characteristics.

While the invention has been described with particular reference to specific embodiments thereof in the interest of complete definiteness, it will be understood that it may be embodied in a variety of forms diverse from those specifically shown and described, without departing from the spirit and scope of the invention as defined by the appended claims.

What is claimed is:

1. A lamination responsive to polarized light of varying direction of polarization applied to a side thereof to produce at its opposite side a light image presenting the illusion of motion of at least parts thereof, comprising the assembly of:
   a polarizing layer at least portions of which are light-transmissive and are polarized in different directions;
   a depolarizing layer of light-transmissive material having the characteristic of substantially randomizing the polarization directions of polarized light passing through it and overlying one side of the polarizing layer; and
   an artwork transparency positioned on the same side of the polarizing layer as the depolarizing layer, said artwork transparency containing image-forming areas of different visual appearances optically aligned with corresponding different ones of said light-transmissive portions of said polarizing layer.

2. The lamination of claim 1, wherein said depolarizing material is also a light-diffusing material.

3. The lamination of claim 2, wherein said layer of depolarizing material comprises a sheet of vellum-parchment drawing paper.

4. The lamination of claim 3, comprising two supporting plates of optically clear material on opposite sides of said assembly.

5. A system for producing animated images by means of polarized light comprising:
   a lamination according to claim 1, and including means for illuminating the rear side of said polarizing layer, opposite from said depolarizing layer, with polarized light having a varying direction of polarization to produce an animated image at the front of said lamination.

6. The system of claim 5, wherein said depolarizing layer comprises a sheet of vellum-parchment drawing paper.

7. The system of claim 6, comprising two supporting plates of optically clear material on opposite sides of said lamination.

8. The system of claim 5, comprising viewing apparatus sensitive to changes in polarization angle of light which it views, positioned to view the front of said lamination.

9. The system of claim 8, wherein said viewing apparatus comprises a camera viewing said front of said lamination.

10. The system of claim 9, wherein said camera is a color motion picture camera.

11. The system of claim 9, wherein said camera is a color television camera.

12. A system for producing color television video tapes, comprising:
   a lamination according to claim 1;
   means for illuminating the rear side of said polarizing layer, opposite from said artwork transparency layer, with polarized light having a varying direction of polarization to produce an animated image at the front of said lamination;
   color television camera apparatus sensitive to changes in polarization angle of the light which it views, positioned to view the front of such lamination; and
   color video tape recorder means connected to said color television camera for producing color video tape recordings of said animated image.

13. The lamination of claim 1, wherein said depolarizing layer is positioned between said polarizing layer and said artwork transparency.

14. The lamination of claim 1 or 13, wherein said depolarizing layer is also a light diffuser.

15. The system of claim 5, wherein said means for illuminating said rear side comprises a light source and a polarizer rotatably mounted between said light source and said lamination.

* * * * *